(12) United States Patent
Stenneth

(10) Patent No.: US 10,003,665 B2
(45) Date of Patent: Jun. 19, 2018

(54) METHOD AND APPARATUS FOR PROVIDING SELECTION AND PRIORITIZATION OF SENSOR DATA

(71) Applicant: HERE GLOBAL B.V., Eindhoven (NL)

(72) Inventor: Leon Stenneth, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days. days.

(21) Appl. No.: 15/651,682

(22) Filed: Jul. 17, 2017

(65) Prior Publication Data

US 2017/0318117 A1    Nov. 2, 2017

Related U.S. Application Data

(63) Continuation of application No. 14/189,728, filed on Feb. 25, 2014, now Pat. No. 9,843,647.

(51) Int. Cl.
*G06F 15/16* (2006.01)
*H04L 29/08* (2006.01)
*H04Q 9/00* (2006.01)

(52) U.S. Cl.
CPC .......... *H04L 67/2842* (2013.01); *H04L 67/12* (2013.01); *H04L 67/322* (2013.01); *H04Q 9/00* (2013.01)

(58) Field of Classification Search
CPC ................................................. H04L 67/2842
See application file for complete search history.

(56) References Cited

U.S. PATENT DOCUMENTS

| 7,257,396 B2 | 8/2007 | Olsen et al. |
| 8,370,392 B1 | 2/2013 | Hunt |
| 2004/0209594 A1 | 10/2004 | Naboulsi |
| 2007/0185646 A1 | 8/2007 | Neugebauer et al. |
| 2010/0027426 A1 | 2/2010 | Nair et al. |
| 2011/0054716 A1 | 3/2011 | Stahlin et al. |
| 2011/0153367 A1 | 6/2011 | Amigo et al. |
| 2012/0208551 A1 | 8/2012 | Hill |
| 2013/0124074 A1 | 5/2013 | Horvitz et al. |

(Continued)

FOREIGN PATENT DOCUMENTS

| EP | 1806880 A1 | 7/2007 |
| EP | 1818873 A1 | 8/2007 |
| WO | 2008024091 A2 | 2/2008 |

OTHER PUBLICATIONS

Office Action for corresponding European Patent Application No. 15155158.7-1855, dated Aug. 19, 2015, 7 Pages.

(Continued)

*Primary Examiner* — Hamza N Algibhah

(74) *Attorney, Agent, or Firm* — Ditthavong & Steiner, P.C.

(57) ABSTRACT

An approach is provided for processing and transmitting sensor data in a bandwidth efficient manner. The approach involves causing, at least in part, a specification of one or more prioritization attributes for one or more sensors associated with at least one transmitting entity. The approach further involves processing and/or facilitating a processing of the one or more prioritization attributes to determine whether to cause, at least in part, (a) a transmission of sensor data associated with the one or more sensors to at least one receiving entity, (b) a caching of the sensor data prior to a batch transmission of the sensor data to the at least one receiving entity, or (c) a combination thereof.

20 Claims, 15 Drawing Sheets

(56) References Cited

U.S. PATENT DOCUMENTS

2013/0163816 A1  6/2013  Hunt, Jr.
2013/0268157 A1  10/2013  Ok et al.
2014/0244104 A1  8/2014  Tan

OTHER PUBLICATIONS

Neagle "Driverless Car is Wireless Star at MIT", Artificial Intelligence, Oct. 12, 2012, 2 Pages.
Nakasako et al., "Software Architecture for Autonomous Vehicles", ABCM Symposium Series in Mechatronics, vol. 2, 2006, pp. 289-296.

FIG. 10

| SENSOR | FREQUENCY | CACHEABLE | MAX CACHED DURATION | DEVIATION ACCEPTABLE | PRIORITY |
|---|---|---|---|---|---|
| FRONT CAMERA | 20HZ | NO | N/A | N/A | 1 |
| GPS | 1HZ | YES | 15 SEC | 3 DEGREES | 4 |
| AM/FM SENSOR | 2HZ | YES | 30 MIN | 4 DECIBLES | 10 |

METHOD AND APPARATUS FOR PROVIDING SELECTION AND PRIORITIZATION OF SENSOR DATA

CROSS REFERENCE TO RELATED APPLICATIONS

This application is a continuation U.S. patent application Ser. No. 14/189,728, filed Feb. 25, 2014, and titled "Method and Apparatus for Providing Selection and Prioritization of Sensor Data", which is incorporated herein by reference in its entirety.

BACKGROUND

Since smart sensors are capable of providing voluminous data in real time, processing and transmitting these data may result in a situation where we overwhelm the available bandwidth. In addition, storage of voluminous sensor data may result in redundancy, thereby wasting system resources, for example, data storage space. Further, the detected sensor data are of unequal importance, and a system that cannot prioritize data on the level of their importance may inundate a cloud system with irrelevant information. Accordingly, service providers and device manufacturers face significant technical challenges in providing a service that selects and prioritizes sensor data to avoid overwhelming the bandwidth of the channels between the at least one vehicle and the receiving entities.

SOME EXAMPLE EMBODIMENTS

Therefore, there is a need for an approach for processing and transmitting sensor data in a bandwidth efficient manner.

According to one embodiment, a method comprises causing, at least in part, a specification of one or more prioritization attributes for one or more sensors associated with at least one transmitting entity. The method also comprises processing and/or facilitating a processing of the one or more prioritization attributes to determine whether to cause, at least in part, (a) a transmission of sensor data associated with the one or more sensors to at least one receiving entity, (b) a caching of the sensor data prior to a batch transmission of the sensor data to the at least one receiving entity, or (c) a combination thereof.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a specification of one or more prioritization attributes for one or more sensors associated with at least one transmitting entity. The apparatus is also caused to process and/or facilitate a processing of the one or more prioritization attributes to determine whether to cause, at least in part, (a) a transmission of sensor data associated with the one or more sensors to at least one receiving entity, (b) a caching of the sensor data prior to a batch transmission of the sensor data to the at least one receiving entity, or (c) a combination thereof.

According to another embodiment, a computer-readable storage medium carries one or more sequences of one or more instructions which, when executed by one or more processors, cause, at least in part, an apparatus to cause, at least in part, a specification of one or more prioritization attributes for one or more sensors associated with at least one transmitting entity. The apparatus is also caused to process and/or facilitate a processing of the one or more prioritization attributes to determine whether to cause, at least in part, (a) a transmission of sensor data associated with the one or more sensors to at least one receiving entity, (b) a caching of the sensor data prior to a batch transmission of the sensor data to the at least one receiving entity, or (c) a combination thereof.

According to another embodiment, an apparatus comprises means for causing, at least in part, a specification of one or more prioritization attributes for one or more sensors associated with at least one transmitting entity. The apparatus also comprises means for processing and/or facilitating a processing of the one or more prioritization attributes to determine whether to cause, at least in part, (a) a transmission of sensor data associated with the one or more sensors to at least one receiving entity, (b) a caching of the sensor data prior to a batch transmission of the sensor data to the at least one receiving entity, or (c) a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 10 is a diagram that represents a labeling scheme to prioritize telematics sensor data and determine if sensor data caching is needed or not, according to one example embodiment;

DESCRIPTION OF SOME EMBODIMENTS

Examples of a method, apparatus, and computer program for processing and transmitting sensor data in a bandwidth efficient manner are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
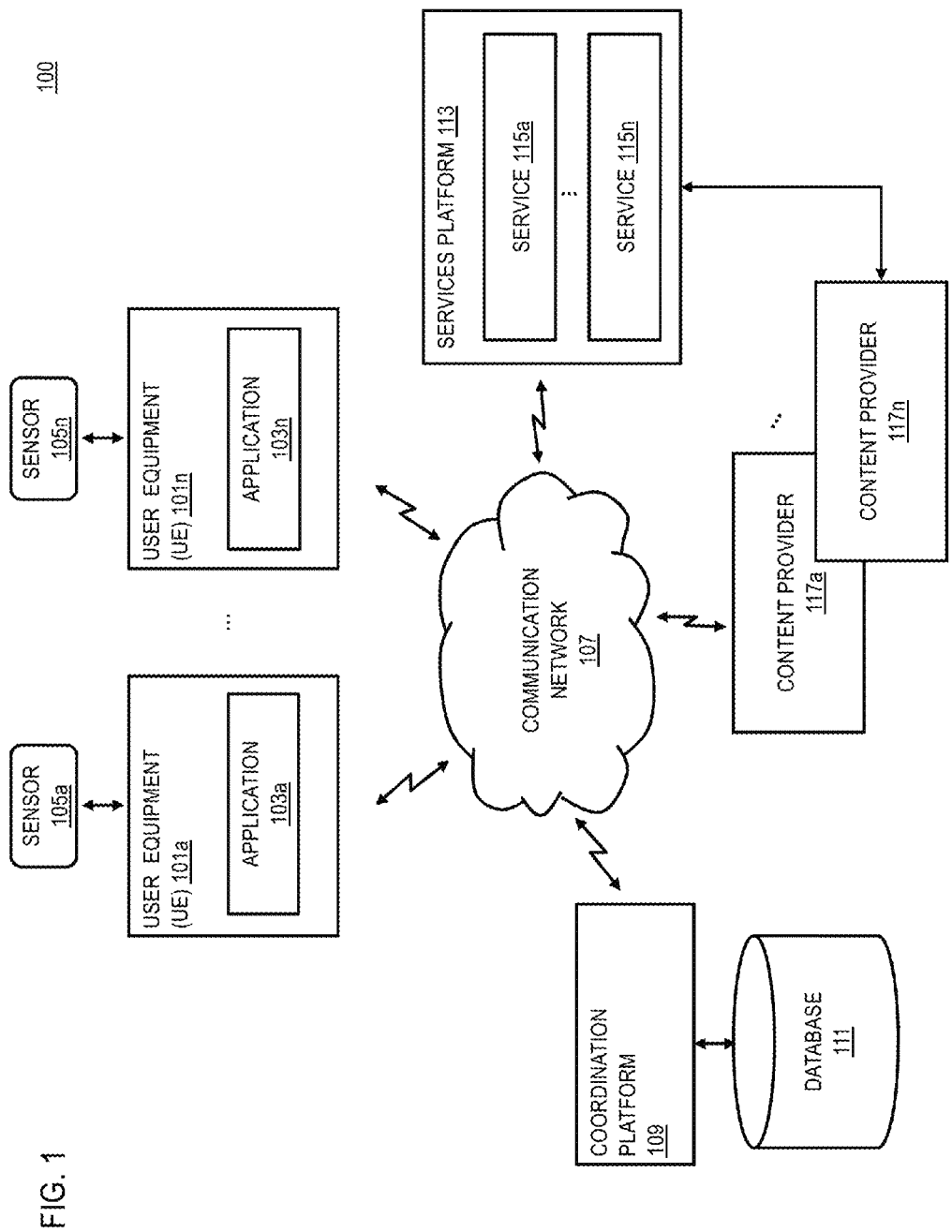
FIG. 1 is a diagram of a system capable of processing and transmitting sensor data in a bandwidth efficient manner, according to one embodiment.

FIG. 1 is a diagram of a system capable of processing and transmitting sensor data in a bandwidth efficient manner, according to one embodiment. Presently, one or more autonomous vehicles are equipped with numerous sensors that can sense both the internal and external environment for a highly assisted driving. The one or more sensors range from light sensors, braking sensors, accelerometer sensors, GPS sensors, video sensors, etc. These sensors are sampled at different frequencies and the amount of sensor data collected in a single second can be huge. For example, one or more sensors of an autonomous driverless vehicle may provide substantial data in real time, for example, telematics sensors generate data at a high rate, quite often in the gigabyte range. The one or more sensors may monitor everything from tire pressure to engine revolutions per minute (RPM) to oil temperature and speed, therefore resulting in gigabytes of sensor data. Currently, the tendency is to collect voluminous sensor data remotely, process them quickly, and then send abstractions and semantics back to the at least one vehicle and/or mobile communication device associated with the at least one vehicle. However, there is no need to collect and process all the received sensor data, thereby making it unreasonable to transmit in real time all available sensor data to the cloud exhausting the available bandwidth. Furthermore, different sensors produces information that is of varying importance, for example, sensor information coming from a radio of the at least one vehicle may not be as important as information coming from the wheel sensors. As a result, there is a need for a system and a method for selecting and prioritizing data received from telematics sensors.

To address this problem, a system 100 of FIG. 1 introduces the capability to select and prioritize telematics sensor data received from the sensors of the at least one vehicle. The one or more sensors in a vehicle may be defined in terms of parameters such as frequency of polling, cache ability and maximum cache duration, deviation acceptable, priority, or a combination thereof. These parameters may define the sense of urgency of transmitting the sensor data to a cloud and/or mobile communication device associated with other vehicles. In one embodiment, the system 100 may use the local cache storage policy and/or the parameters values to store data in a cache, and then transmit them accordingly.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or WiFi connection either through the inbuilt communication equipment or from the UE 101 associated with the vehicles. The applications 103 may assist in conveying sensor information via the communication network 107.

By way of example, the applications 103 may be any type of application that is executable at the UE 101, such as location-based service applications, navigation applications, mapping application, content provisioning services, camera/imaging application, media player applications, social networking applications, calendar applications, and the like. In one embodiment, one of the applications 103 at the UE 101 may act as a client for the coordination platform 109 and perform one or more functions associated with the functions of the coordination platform 109 by interacting with the coordination platform 109 over the communication network 107.

By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, WiFi, Li-Fi, near field communication etc.), temporal information, a camera/imaging sensor for gathering image data, an audio recorder for gathering audio data, and the like. In one scenario, the sensors 105 may include, light sensors, oriental sensors augmented with height sensor and acceleration sensor, tilt sensors, moisture sensors, pressure sensors, audio sensors (e.g., microphone) etc. It is contemplated that the sensors 105 includes one or more components for selecting and/or prioritizing one or more sensor data based on their attributes. It is contemplated that the sensors 105 includes components for detecting one or more attributes for the one or more detected sensor data.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the coordination platform 109 may be a platform with multiple interconnected components. The coordination platform 109 may include multiple servers, intelligent networking devices, computing devices, components and corresponding software for processing and transmitting sensor data in a bandwidth efficient manner. In addition, it is noted that the coordination platform 109 may be a separate entity of the system 100, a part of the one or more services 115 of the service platform 113, or included within the UE 101 (e.g., as part of the applications 103). In one embodiment, the coordination platform 109 may cause, at least in part, a specification of one or more prioritization attributes for one or more sensors associated with at least one transmitting entity. The coordination platform 109 may process and/or facilitate a processing of one or more sensor data to determine their attributes. The one or more attributes includes frequency information, cache ability information, duration information, urgency of processing information, deviation acceptable information or a combination thereof. Then, the coordination platform 109 may determine priority information for one or more sensor data based, at least in part, on one or more attributes. In another embodiment, the coordination platform 109 may process and/or facilitate a processing of the one or more prioritization attributes to determine whether to cause, at least in part, (a) a transmission of sensor data associated with the one or more sensors to at least one receiving entity, (b) a caching of the sensor data prior to a batch transmission of the sensor data to the at least one receiving entity, or (c) a combination thereof. The coordination platform 109 may cause a transmission and/or a caching of at least one sensor data over the wireless network to one or more vehicles, the UE 101 associated with the one or more vehicles, or a combination thereof based, at least in part, on the priority information.

There is a need to maintain the bandwidth of the wireless channel between the at least one vehicle and the cloud, accordingly the coordination platform 109 may prioritize the sensor data retrieval process, and may control the transmission of the sensor data to the at least one automotive vehicle and/or a UE 101 associated with the at least one vehicle. In one embodiment, the coordination platform 109 may define the number of attributes for each sensor. In one scenario, the frequency for at least one sensor may define the number of times a sensor data may be retrieved, for example, a GPS sensor may be retrieved every 1 to 30 seconds as compared to every millisecond. Further, frequency for sensor data may be changed based on the contextual information, for example, a user driving at 10 miles per hour may not need to collect sensor data as compared to the user driving at 100 miles per hour. In another scenario, the cacheable attribute of a sensor data may determine whether a sensor data may be archived before transmission (i.e. whether the transmission for one or more sensor data can be delayed) or the sensor data should be transmitted in real time. For example, collision detection data should be sent to the cloud immediately because the data is related to safety and should not be cached before transmission. On the other hand, a sensor data relating to the trunk of the at least one vehicle is not critical and can be archived before it can be sent to the cloud. In a further scenario, the coordination platform 109 may determine whether newly incoming sensors data is to be added to the cache or should be fed to the system, for example, if incoming location information via GPS sensors is similar to the stored location information, the coordination platform 109 may determine not to store the sensor data and may transmit the sensor data based on urgency of processing.

In one embodiment, the coordination platform 109 may update the stored data information, for example, the coordination platform 109 may determine not to override the stored temperature information in the database 111 because the difference between the stored temperature information and the newly received temperature information is just one degree. In another embodiment, the coordination platform 109 may determine timestamp information during sensor data collection, for example, each sensor data stored in the database 111 has timestamp. The coordination platform 109 may synchronize polling frequency for one or more sensor data based, at least in part, on timestamp information, thereby ensuring freshness of stored sensor data. In a further embodiment, the coordination platform 109 may cause a hierarchical structure for one or more sensors, for example, if location information is collected via GPS sensors, then the coordination platform 109 may categorize the GPS sensor with other location based sensors, such as an accelerometer. The coordination platform 109 may group one or more sensors and may make them work as one unit. In one scenario, the coordination platform 109 may prioritize one or sensors based, at least in part, on such categorization.

In one embodiment, the coordination platform 109 may receive at least one sensor data request from at least one receiving entity based, at least in part, on the availability of sensor data, location of at least one vehicle, or a combination thereof. In one example embodiment, the coordination platform 109 may transmit sensor data from the at least one UE 101 associated with the at least one vehicle to the cloud based, at least in part, on a request from the cloud. In another embodiment, the coordination platform 109 may determine sensor data resolution during transmission based, at least in part, on the location information of at least one vehicle. In a further embodiment, the coordination platform 109 may process one or more sensor data to determine their relevancy and/or adequacy, whereupon the coordination platform 109 may cause, at least in part, a notification to at least one UE 101 associated with the at least one vehicle on the adequacy and/or relevancy of sensor data.

As discussed, the UE 101 may utilize location-based technologies (sensors, GPS receivers, etc.) to determine location and temporal information regarding the UE 101 associated with the at least one vehicle. For example, the UE 101 may use one or more sensors to obtain information on the orientations, safety and security, diagnostic and emission, or a combination thereof on the one or more vehicles. In one embodiment, the coordination platform 109 may create the database 111 wherein the determined information, for example, orientation information and/or safety and security information and/or diagnostic and emission information may be stored. In another embodiment, the coordination platform 109 may receive content information from various sources, for example, third-party content providers, various databases, etc. and may store the received information on the database 111. The database 111 may include identifiers to the UE 101s as well as the associated information. Further, the information may be any multiple types of information that can provide means for aiding in the content provisioning process. In a further embodiment, the coordination platform 109 may store one or more sensor data based, at least in part, on priority information, cache ability information, cache duration information, or a combination thereof. Then, the coordination platform 109 urgency of processing information for one or more sensor data. Subsequently, the coordination platform 109 may transmit one or more sensor data at a certain resolution from the database 111 based on sensor data attributes.

The services platform 113 may include any type of service. By way of example, the services platform 113 may include mapping services, location based services, navigation services, travel planning services, social networking services, content (e.g., audio, video, images, etc.) provisioning services, application services, storage services, contextual information determination services, information (e.g., weather, news, etc.) based services, etc. In one embodiment, the services platform 113 may interact with the UE 101, the coordination platform 109 and the content providers 117 to supplement or aid in the processing of the sensor information.

By way of example, the services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the coordination platform 109 with travel information for the one or more vehicles.

The content providers 117 may provide content to the UE 101, the coordination platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in sensor data selection and/or prioritization. In one embodiment, the content providers 117 may also store content associated with the UE 101, the coordination platform 109, and the services 115 of the services platform 113. In another embodiment, the content providers 117 may manage access to a central repository of data, and offer a consistent, standard interface to data, such as a repository of users' navigational data content.

By way of example, the UE 101, the coordination platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
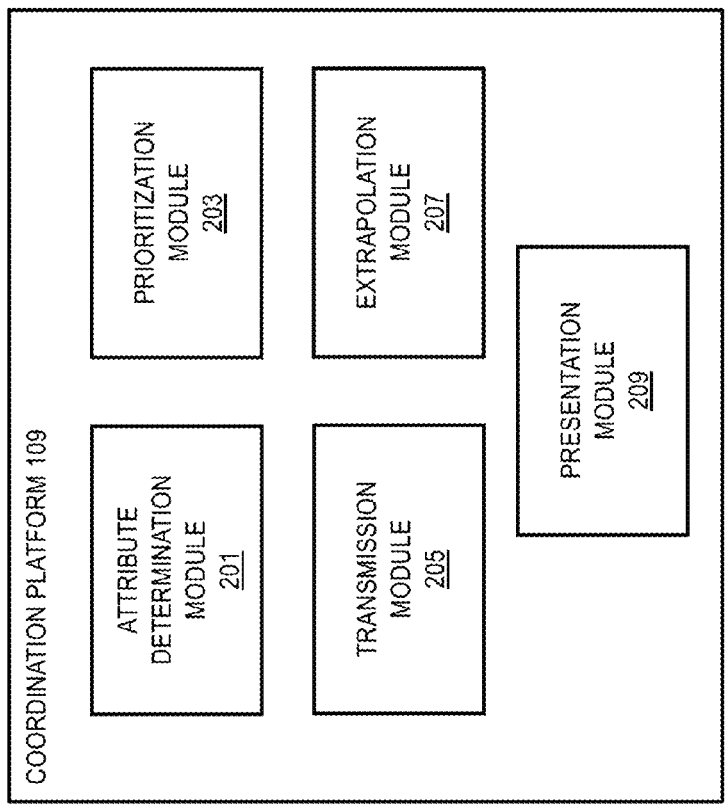
FIG. 2 is a diagram of the components of the coordination platform 109, according to one embodiment.

FIG. 2 is a diagram of the components of the coordination platform 109, according to one embodiment. By way of example, the coordination platform 109 includes one or more components for processing and transmitting sensor data in a bandwidth efficient manner. It is contemplated that the functions of these components may be combined in one or more components or performed by other components of equivalent functionality. In this embodiment, the coordination platform 109 includes an attribute determination module 201, a prioritization module 203, a transmission module 205, an extrapolation module 207 and a presentation module 209.

In one embodiment, the attribute determination module 201 may process and/or facilitate a processing of one or more data detected via one or more sensors associated with the at least one vehicle to determine their attributes. The attribute determination module 201 may determine the attributes of the one or more sensor data to control the quantity and the type of data that is sent to the cloud. The attributes of the one or more sensor data may include frequency information, cache ability information, duration information, urgency of processing information, deviation acceptable information or a combination thereof. In another embodiment, the attribute determination module 201 may process and/or facilitate a processing of one or more sensor data to determine their relevancy and/or adequacy. In a further embodiment, the attribute determination module 201 may cause, at least in part, a deletion of at least one stored sensor data based, at least in part, on a determination that at least one sensor data has exceeded maximum cache duration.

In one embodiment, the prioritization module 203 may determine priority information for one or more sensor data based, at least in part, on the attribute information provided by the attribute determination module 201. In another embodiment, the prioritization module 203 may cause, at least in part, a temporary storing of at least one sensor data before transmission based, at least in part, on the priority information. In one scenario, a lower priority determined by the prioritization module 203 for at least one sensor data may establish the urgency of storing the at least one sensor data. In a further embodiment, the prioritization module 203 may cause, at least in part, a comparison of one or more sensor data to avoid storing of duplicate sensor data.

In one embodiment, the transmission module 205 may cause transmission of at least one sensor data over the wireless network to one or more UE 101 associated with the at least one vehicle based, at least in part, on the priority information. In another embodiment, the one or more sensor data is transmitted at a certain resolution either in real time or from cache based, at least in part, on the amount of sensor data, timestamp information, or a combination thereof. In a further embodiment, the transmission module 205 may cause transmission of one or more sensor data at certain resolution based, at least in part, on the location information of at least one vehicle.

In one embodiment, the extrapolation module 207 may determine one or more sensor data for at least one cell of a map maintained by the at least one receiving entity. The extrapolation module 207 may process and/or facilitate a processing of one or more sensor data for the neighboring cells based, at least in part, on a determination that the at least one cell has inadequate sensor data.

In one embodiment, the presentation module 209 obtains a set of summary statistics from the other modules. Then, the presentation module 209 continues with generating a presentation corresponding to the request. In one embodiment, the presentation module 209 may cause, at least in part, a notification to at least one UE 101 associated with the at least one vehicle on adequacy of sensor data based, at least in part, on adequacy and/or relevancy information provided by attribute determination module 201. In another embodiment, the presentation module 209 may cause a presentation of the at least one request for at least one sensor data from at least one receiving entity based, at least in part, on a determination of insufficient location information, availability of sensor data, location of at least one vehicle, or a combination thereof. In a further embodiment, the presentation module 209 may cause a presentation of content information (for example, processing or filtering of sensor data) in the most suitable manner for consistent user experience.

The above presented modules and components of the coordination platform 109 can be implemented in hardware, firmware, software, or a combination thereof. Though depicted as a separate entity in FIG. 1, it is contemplated that the coordination platform 109 may be implemented for direct operation by respective UE 101. As such, the coordination platform 109 may generate direct signal inputs by way of the operating system of the UE 101 for interacting with the applications 103. In another embodiment, one or more of the modules 201-209 may be implemented for operation by respective UEs, as a coordination platform 109, or combination thereof. Still further, the coordination platform 109 may be integrated for direct operation with the services 115, such as in the form of a widget or applet, in accordance with an information and/or subscriber sharing arrangement. The various executions presented herein contemplate any and all arrangements and models.

Figure 3:
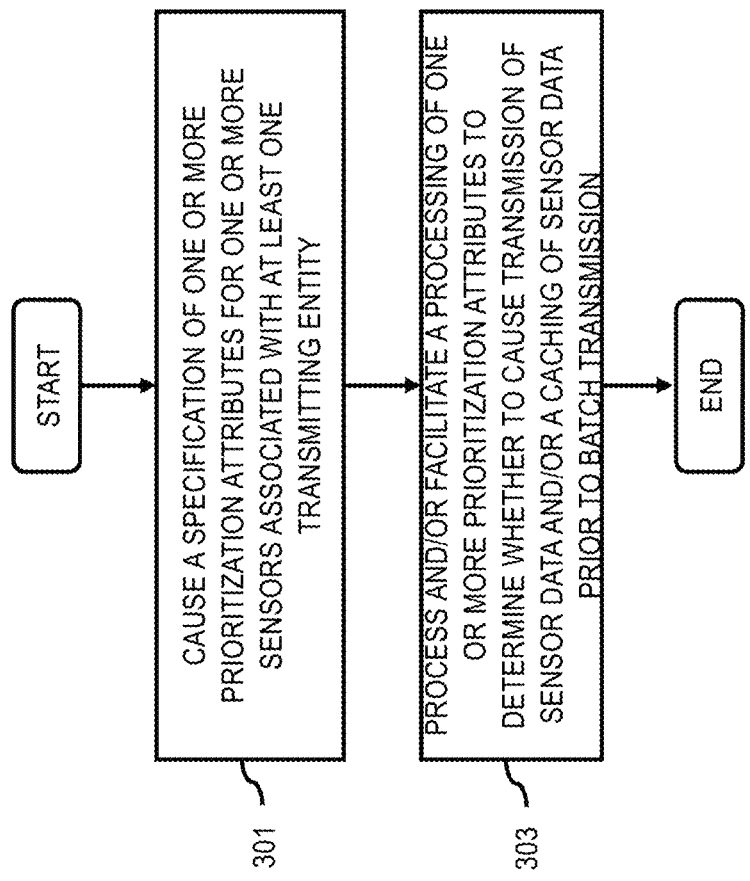
FIG. 3 is a flowchart of a process for causing prioritization of attributes for sensor data associated with at least one transmitting entity to determine transmission and/or caching of one or more sensor data, according to one embodiment.
Figure 14:
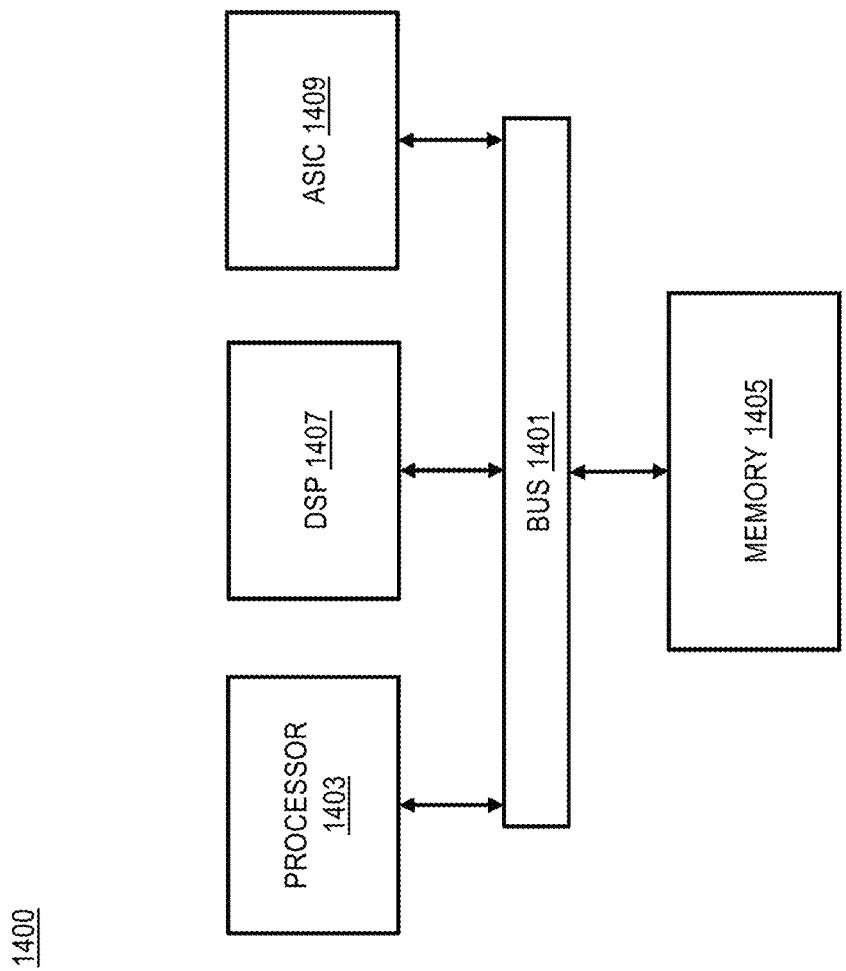
FIG. 14 is a diagram of a chip set that can be used to implement an embodiment of the invention.

FIG. 3 is a flowchart of a process for causing prioritization of attributes for sensor data associated with at least one transmitting entity to determine transmission and/or caching of one or more sensor data, according to one embodiment. In one embodiment, the coordination platform 109 performs the process 300 and is implemented in, for instance, a chip set including a processor and a memory as shown in FIG. 14.

In step 301, the coordination platform 109 causes, at least in part, a specification of one or more prioritization attributes for one or more sensors associated with at least one transmitting entity. In one embodiment, the specification of the one or more prioritization attributes is with respect to at least one application associated with the at least one receiving entity, the at least one transmitting entity, or a combination thereof. In another embodiment, the one or more prioritization attributes include, at least in part, a priority ranking, a polling frequency, a cacheability indicator, a maximum cache duration, an acceptable deviation criterion, or a combination thereof. In one embodiment, the at least one transmitting entity, the at least one receiving entity, or a combination thereof include, at least in part, one or more vehicles, one or more mobile devices, or a combination thereof.

In step 303, the coordination platform 109 processes and/or facilitates a processing of the one or more prioritization attributes to determine whether to cause, at least in part, (a) a transmission of sensor data associated with the one or more sensors to at least one receiving entity, (b) a caching of the sensor data prior to a batch transmission of the sensor data to the at least one receiving entity, or (c) a combination thereof. In one example embodiment, the priority information may assist the coordination platform 109 in determining the urgency in processing one or more sensor data. The coordination platform 109 may determine whether the at least one sensor data may be stored and/or the at least one sensor data needs to be extracted from the cache and transmitted to the cloud in an urgent basis and/or the at least one sensor data needs immediate transmission to a receiving entity based, at least in part, on the priority information. In another example embodiment, there may be two or more sensors that may request data transmission, then the coordination platform 109 may allow the sensor with the highest importance to be transmitted before others, for example, data from a front camera sensor may be transmitted before other sensor data because the data is associated with user safety and needs immediate processing. In a further embodiment, the coordination platform 109 may determine whether predefined expectations for one or more vehicles are met. The at least one vehicle may need to transmit sensor data aggressively if the vehicle has not satisfied the predefined expectation. Such priority between one or more sensors may be set at an implementation level.

Figure 4:
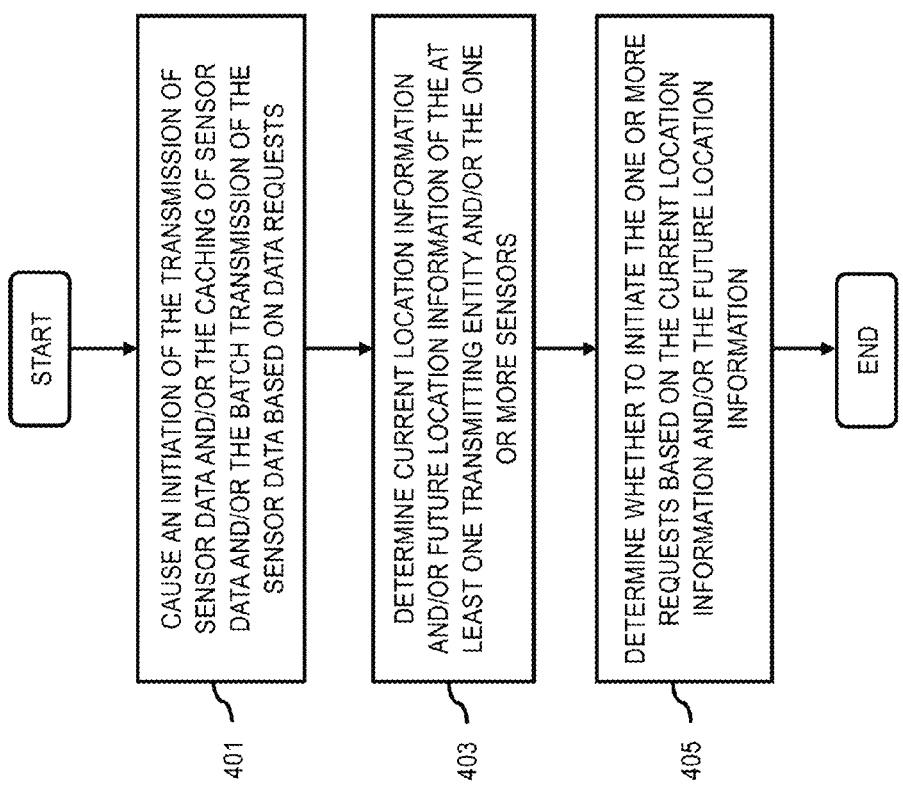
FIG. 4 is a flowchart of a process for initiating transmission and/or caching of sensor data based, at least in part, on one or more data requests, location information, or a combination thereof, according to one embodiment.

FIG. 4 is a flowchart of a process for initiating transmission and/or caching of sensor data based, at least in part, on one or more data requests, location information, or a combination thereof, according to one embodiment. In one embodiment, the coordination platform 109 performs the process 400 and is implemented in, for instance, a chip set including a processor and a memory as shown in FIG. 14.

In step 401, the coordination platform 109 causes, at least in part, an initiation of the transmission of the sensor data, the caching of the sensor data, the batch transmission of the sensor data, or a combination thereof based, at least in part, on one or more data requests from the at least one receiving entity, the at least one transmitting entity, or a combination thereof. In one scenario, the coordination platform 109 may receive a data request from at least one cloud and/or at least one vehicle, whereby the coordination platform 109 may process one or more sensor data to determine their attributes. Subsequently, the coordination platform 109 may prioritize the sensor data, and may cause transmission of one or more sensor data based, at least in part, on a determination that the sensor data needs immediate transmission. The coordination platform 109 may also cause caching of sensor data based, at least in part, on a determination that the sensor data may be stored temporarily before transmission. In one scenario, the lower the telematics sensor priority, then the more important is the telematics sensor data.

In step 403, the coordination platform 109 determines current location information, future location information, or a combination thereof of the at least one transmitting entity, the one or more sensors, or a combination thereof. In one scenario, the coordination platform 109 may determine one or more geo-routes for at least one vehicle using historical and/or predicted location information, such as the daily work commute traveled by one or more UE 101 associated with the at least one vehicle. The coordination platform 109 may select sensor data for one or more POI because the history of geo-routes for the at least one vehicle indicates that they will soon be proximate location (e.g., regardless of whether the UE 101 are already in the location, as the predicted location information suggests that UE 101 may soon be within the vicinity). Further, the coordination platform 109 may determine one or more future locations for at least one vehicle based, at least in part, on the ease of access from a location associated with the UE 101.

In step 405, the coordination platform 109 determines whether to initiate the one or more requests based, at least in part, on the current location information, the future location information, or a combination thereof. In one scenario, a cloud may submit a request for sensor data to a coordination platform 109 based on the current and/or future location of the at least one vehicle. Then, the coordination platform 109 may determine resolution of data request based on the location of at least one vehicle, for example, data resolution at blind spots may have higher resolution. The coordination platform 109 may also determine the importance of different regions by the amount of available sensor data, and the current and future path of other vehicles.

Figure 5:
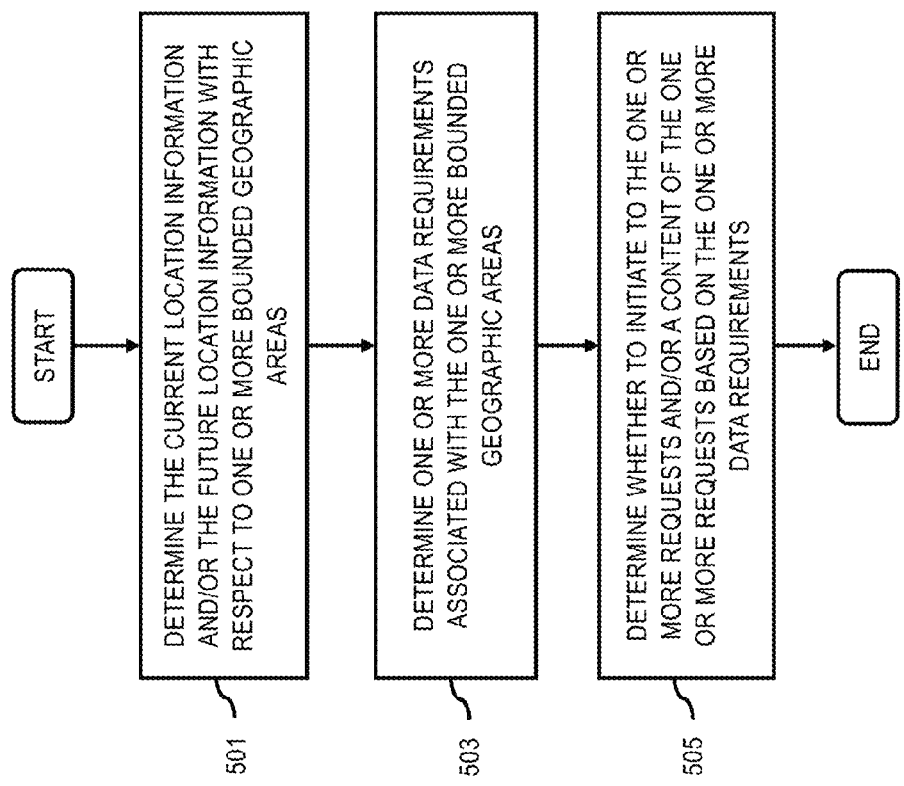
FIG. 5 is a flowchart of a process for determining location information and/or data requirements with respect to one or more bounded geographic areas, wherein determination to initiate requests and/or content of the one or more requests is further based on data requirements, according to one embodiment.

FIG. 5 is a flowchart of a process for determining location information and/or data requirements with respect to one or more bounded geographic areas, wherein determination to initiate requests and/or content of the one or more requests is further based on data requirements, according to one embodiment. In one embodiment, the coordination platform 109 performs the process 500 and is implemented in, for instance, a chip set including a processor and a memory as shown in FIG. 14.

In step 501, the coordination platform 109 determines the current location information, the future location information, or a combination thereof with respect to one or more bounded geographic areas. In one example embodiment, when the at least one vehicle is traveling, the at least one vehicle may submit its location information to the automatic cloud. Subsequently, the cloud may compare the location information of the at least one vehicle with the grid map it maintains, and may determine the at least one cell wherein the vehicle is located. The cloud upon locating the at least one vehicle may make further queries, for example, once the cell is identified the cloud may check if there is enough data about the cell. Then, the cloud may provide the at least one UE 101 associated with the at least one vehicle with the one or more data. In one scenario, each cell may represent a region in space, for example, a cell may be an intersection of a street, the coordination platform 109 may maintain fresh information for such cells and may provide the UE 101 associated with the at least one vehicle with sensor data from processing of such fresh information. In another scenario, when one or more vehicles reach the intersection region, the vehicles may need to aggressively submit sensor information, whereas vehicles at a country side may submit sensor information at a very slow rate. In another embodiment, the data rate and its functionality is based, at least in part, on the characteristics on the at least one cell. In such manner information from the sensors of numerous vehicles may be used to make decision for the at least one vehicle.

In step 503, the coordination platform 109 determines one or more data requirements associated with the one or more bounded geographic areas. In one scenario, the coordination platform 109 determines whether the sensor information in the at least one determined region (i.e. cell) within the bounded geographic area is relevant and/or adequate. If the coordination platform 109 is of determination that there is not enough sensor data about the cell, the coordination platform 109 may send a request to the one or more vehicles to submit telematics sensor in real time or from the cache. Then, the one or more vehicles may send sensor data at a certain resolution depending on the amount of information and the timestamp. On the another hand, if there is sufficient sensor data in a cell then the coordination platform 109 may inform the one or more vehicles that the sensor data need not be submitted.

In step 505, the coordination platform 109 determines (a) whether to initiate to the one or more requests, (b) a content of the one or more requests, or (c) a combination thereof based, at least in part, on the one or more data requirements.

Figure 6:
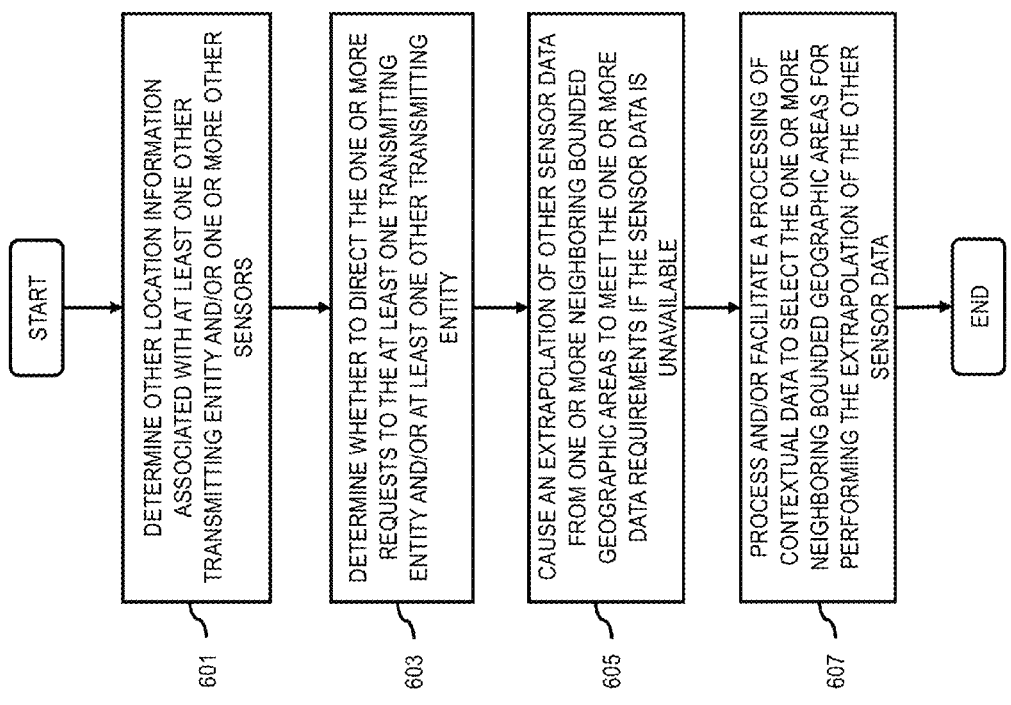
FIG. 6 is a flowchart of a process for determining whether to direct the one or more requests to one or more transmitting entities, and causing extrapolation of sensor data from neighboring bounded geographic areas to meet data requirements, according to one embodiment.

FIG. 6 is a flowchart of a process for determining whether to direct the one or more requests to one or more transmitting entities, and causing extrapolation of sensor data from neighboring bounded geographic areas to meet data requirements, according to one embodiment. In one embodiment, the coordination platform 109 performs the process 600 and is implemented in, for instance, a chip set including a processor and a memory as shown in FIG. 14.

In step 601, the coordination platform 109 determines other location information associated with at least one other transmitting entity, one or more other sensors, or a combination thereof.

In step 603, the coordination platform 109 determines whether to direct the one or more requests to the at least one transmitting entity, the at least one other transmitting entity, or a combination thereof based, at least in part, on (a) the other location information; (b) the current location information; (c) the future location information; (d) the one or more data requirements; (e) data availability information associated the at least one transmitting entity, the at least one other transmitting entity; (f) resource availability information associated the at least one transmitting entity, the at least one other transmitting entity; or (g) a combination thereof.

In step 605, the coordination platform 109 causes, at least in part, an extrapolation of other sensor data from one or more neighboring bounded geographic areas to meet the one or more data requirements if the sensor data is unavailable. In one scenario, the coordination platform 109 may determine that the at least one cell within the bounded geographic areas does not have necessary sensor data, pursuant to which the coordination platform 109 may use the functionality of the neighboring cells to gather information for the at least one cell with inadequate sensor data. The coordination platform 109 may cause an expansion of the region in the bounded geographic areas for relevant and adequate sensor data. In one scenario, the coordination platform 109 may cause query expansion to the neighboring cells based, at least in part, on location information, weather information, or combination thereof.

In step 607, the coordination platform 109 processes and/or facilitates a processing of contextual data to select the one or more neighboring bounded geographic areas for performing the extrapolation of the other sensor data. In one scenario, the coordination platform 109 may determine that cell number 5 associated with a roadway crossing has inadequate sensor information, whereby the coordination platform 109 may query other cells for relevant and adequate sensor information. The coordination platform 109 may process the contextual data of one or more neighboring cells, for example, the coordination platform 109 may process contextual information of cell number 3 and cell number 4, whereby the coordination platform 109 may select cell number 3 over cell number 4 because cell number 3 is associated with roadways crossing whereas cell number 4 is associated with a river crossing.

Figure 7:
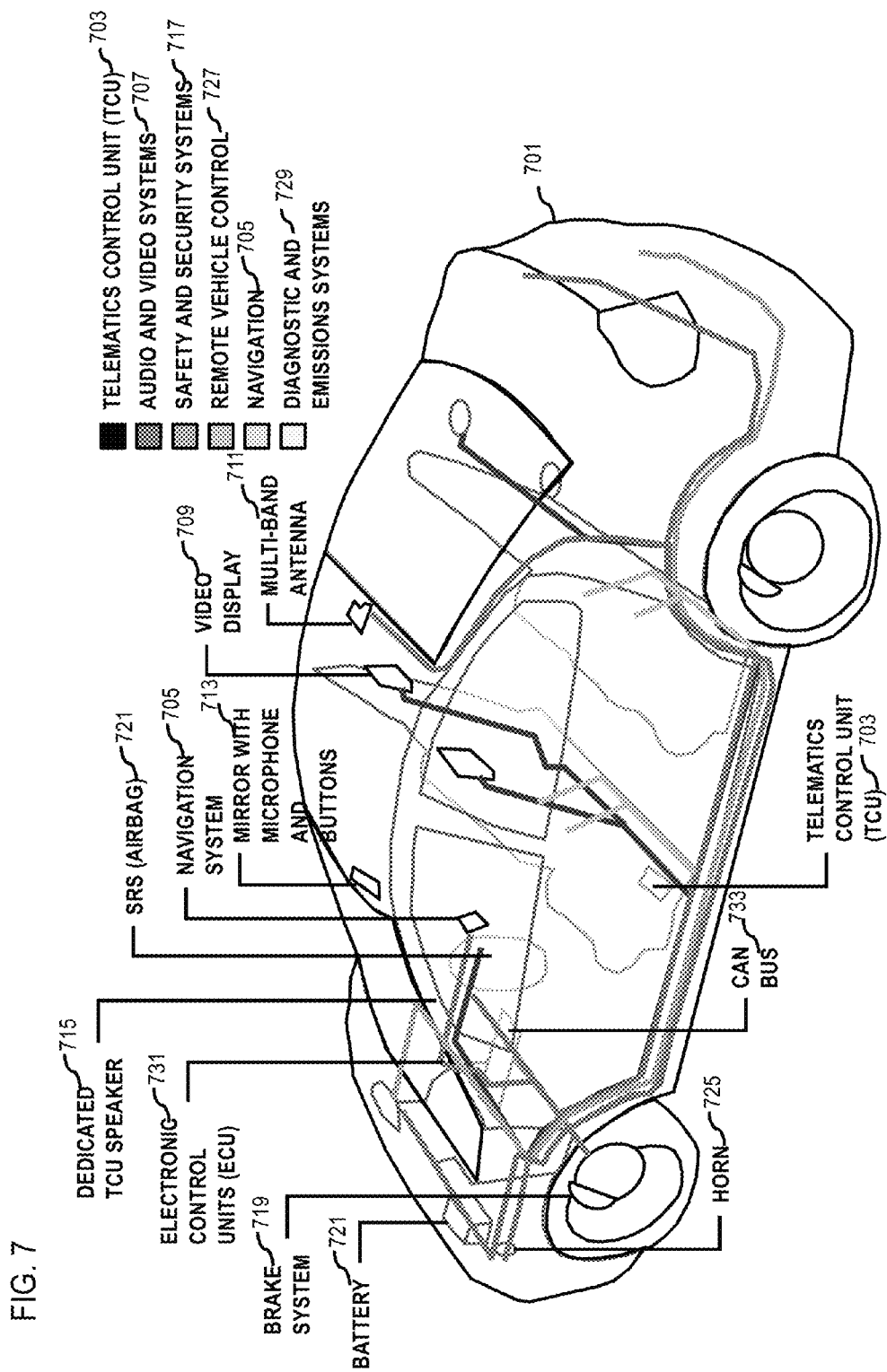
FIG. 7 is a diagram that represents an autonomous vehicle with multiple sensors for highly assisted driving, according to one example embodiment.

FIG. 7 is a diagram that represents an autonomous vehicle with multiple sensors for highly assisted driving, according to one example embodiment. The autonomous vehicle [701] has several sensors that can sense both the internal and external environment of the car. In one scenario, the autonomous vehicle comprises of a telematics control unit (TCU) [703] that controls tracking of a vehicle, and a navigation unit [705] for guidance while driving. The autonomous vehicle also comprises of an audio and video systems [707] which may provide audial and visual contents to at least one vehicle. The audio and video systems may include a video display unit [709], a multi-band antenna [711], a mirror with microphone and buttons [713], a dedicated TCU speakers [715] etc. The autonomous vehicle further comprises of a safety and a security system [717] which may include a braking sensors [719] for applying the brakes to slow the at least one vehicle without any driver input upon detection of an imminent collision with other vehicles and/or objects, an accelerometer sensors for measuring the tilt and motion for at least one vehicle, a supplemental restraint (SRS) airbag [721], battery [723], horn [725] etc. The autonomous vehicle also comprises of a remote vehicle control unit [727], a diagnostic and emissions systems [729], an electronic control unit (ECU) [731], controller area network (CAN bus) [733] etc. These sensors are processed at different frequencies and the volume of sensor data collected in a single second can be huge. Presently, all these sensor data are collected remotely and processed, whereupon the abstractions and semantics are transmitted back to the at least one vehicle. Since, these sensors generate data at a high rate, quite often in a gigabyte range, it is impractical to transmit these sensor data in real time. Furthermore, different sensor produces information that is of varying importance, for example, sensor information coming from the radio of the at least one vehicle may not be as important as information coming from the wheel sensor. As a result, there is a need to prioritize or rank one or more sensor data so that we do not overwhelm the bandwidth of the channels between the vehicle and the receiving entity.

Figure 8:
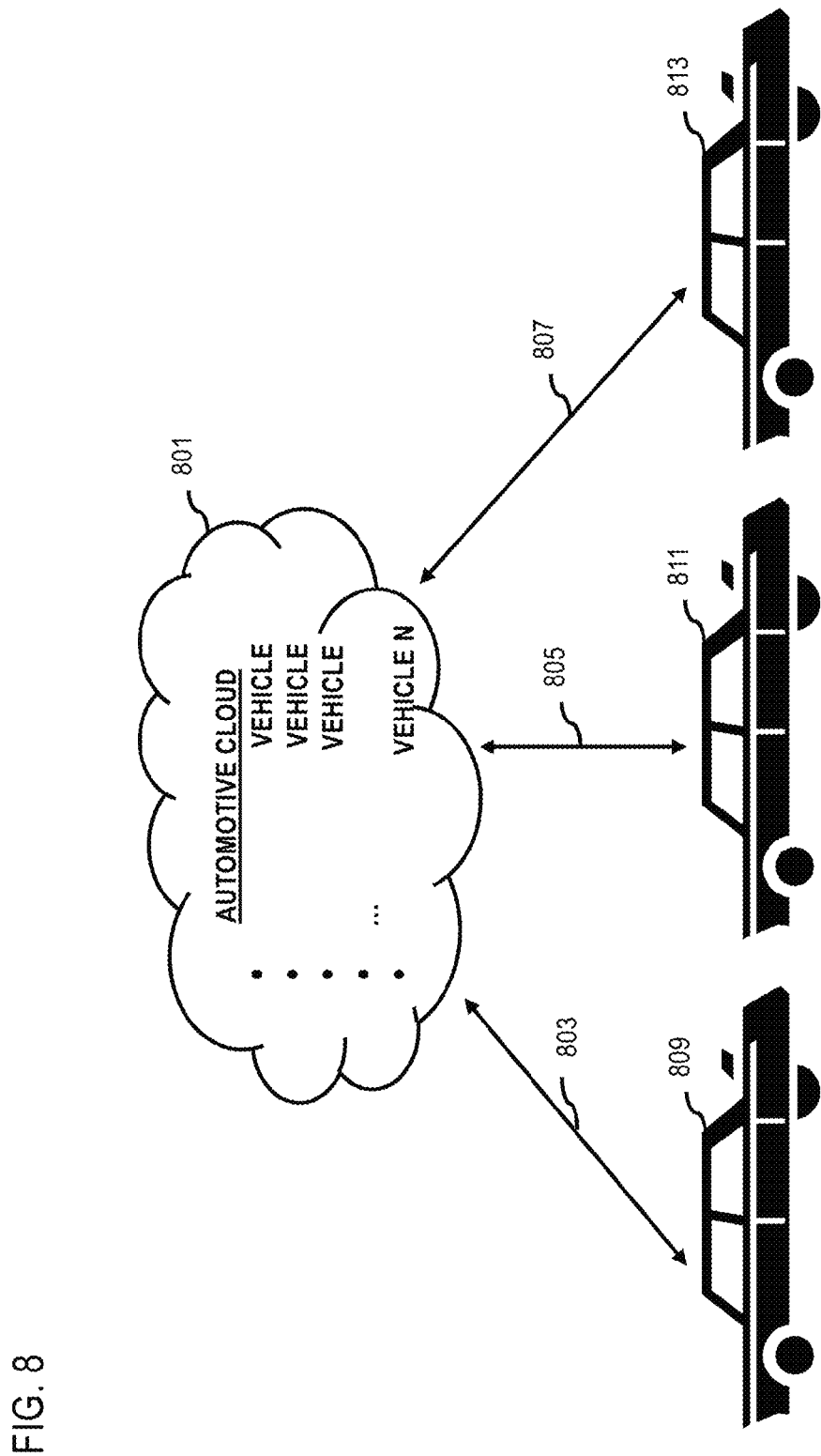
FIG. 8 is a user interface diagram of a cloud based architecture wherein one or more vehicles sends sensor data to a cloud for processing, according to one example embodiment

FIG. 8 is a user interface diagram of a cloud based architecture wherein one or more vehicles sends sensor data to a cloud for processing, according to one example embodiment. The cloud [801] is the receiving entity and the wireless connection [803, 805, 807] between the one or more vehicle [809, 811, 813] and the cloud [801] are the channels. In general, a receiving entity [801] may receive telematics sensor data from the at least one vehicle [809]. The receiving entity is not restricted to any architecture, and may exist in any telematics sensor application model. In one scenario, vehicle [809], vehicle [811] and vehicle [813] may have a wireless connection [803, 805, 807] to the cloud [801]. The one or more vehicles [809, 811, 813] may provide the cloud [801] with sensor data, whereupon the cloud [801] may process the sensor data. Then, the cloud [801] may prioritize the one or more sensor data for transmission to the at least one vehicle.

Figure 9:
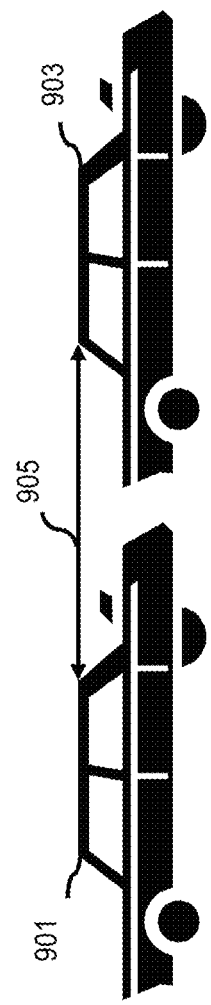
FIG. 9 is a user interface diagram of a peer based architecture wherein one or more vehicles communicate with each other, according to one example embodiment.

FIG. 9 is a user interface diagram of a peer based architecture wherein one or more vehicles communicate with each other, according to one example embodiment. For such non-cloud peer-based setup the receiving entities are the vehicles [901, 903] and the link between the vehicles are the channels [905]. In one scenario, vehicle [901] and vehicle [903] may transmit sensor data between each other instead of transmitting them to the cloud. In another scenario, a duplex communication is possible over the communication network whereby the one or more vehicles [901, 903] may be connected either with the cloud or with each other in a peer based architecture [905].

FIG. 10 is a diagram that represents a labeling scheme to prioritize telematics sensor data and determine if sensor data caching is needed or not, according to one example embodiment. In one scenario, sensor data is only transmitted based, at least in part, on a request from the receiving entity. The receiving entity submits one or more requests for sensor data based, at least in part, on the availability of sensor data in that region, current and future path of other vehicles, or a combination thereof. The at least one vehicle maintains a local cache on-board where sensor information can be archived temporarily and then batched before transmission over the wireless network to the automotive cloud. In the first phase, each sensor is defined in terms of sensors [1001], frequency [1003], cache ability [1005], maximum cache duration [1007], deviation acceptable [1009], and priority [1011]. In one embodiment, frequency [1003] determines how often one or more sensor data can be accessed. Such access is based, at least in part, on a determination that some sensors should be polled frequently compared to other sensors. In another embodiment, cacheable [1005] determines whether one or more sensor data can be archived in the vehicle before it can be transmitted to the cloud for processing. Such determination is based, at least in part, on whether transmission of one or more sensor data can be delayed or must be made in real time. In a further embodiment, maximum (max) cache duration [1007] determines the maximum time one or more sensor data should be stored in the local cache of the at least one vehicle. Any sensor data that exceeds the max cache duration is pruned from the cache and not sent across the channel. This way the receiving entity never receives stale telematics sensor data. In one embodiment, deviation acceptable [1009] determines whether the newly incoming sensor data should be added to the cache or dropped from the system. Intuitively, only those sensor data can be added to the cache if it deviates from the sensor data already in the cache by a significant margin. Such process of ensuring that similar data is not in the cache mitigates archiving of duplicate data. If there is no data in the cache for at least one sensor, then add the data to the cache. Whereas if the data is already in the cache, then add the new sensor data only if it is outside the acceptable level of deviation. For example, if there is a GPS report in the cache, then don't add another GPS report unless the GPS report has changed by more than 3 degrees [1013]. In another embodiment, the priority field [1011] determines the urgency of processing one or more sensor data. In one scenario, a lower telematics sensor priority may denote an important telematics sensor data. Since there are two categories of sensor data (i.e. cacheable and non-cacheable), the priority is determined in two levels. In the first level (i.e. cacheable sensor), the priority dictates the urgency of writing the sensor data to the cache. If a sensor that is cacheable and has a priority of X and another cacheable sensor has a priority of Y, then X sensor data is the first to be sent to the cache, if X<Y. Further, the X sensor data may be removed from the cache and placed on the channel before the Y sensor data. On the other hand, If X=Y, then any sensor data can be sent to the cache and removed from the cache since the priorities are the same. Whereas, for sensors that are not cacheable, the priority dictates which sensor first puts their data on the channel for the receiving entity to consume. Subsequently, importance of each sensor data is determined in terms of local caching. In one scenario, if the sensor data is too critical, and if it is cached locally on the car for a few seconds it can cause harm to the driver. Such sensor data cannot be cached and needs to be transmitted to the receiving entity immediately. In one example embodiment, for avoidance of a collision, data coming from the front cameras should not be cached, and should be sent to the receiving entity instantaneously. If such sensor data is cached for too long the at least one vehicle may miss obstacles along its path. In another example embodiment, data coming from the AM/FM antenna could be cached and not sent to the cloud immediately because such sensor information is secondary for collision avoidance purposes. In such manner, the telematics sensor data filtering can be performed without overwhelming the channels for the receiving entities.

Figure 11:
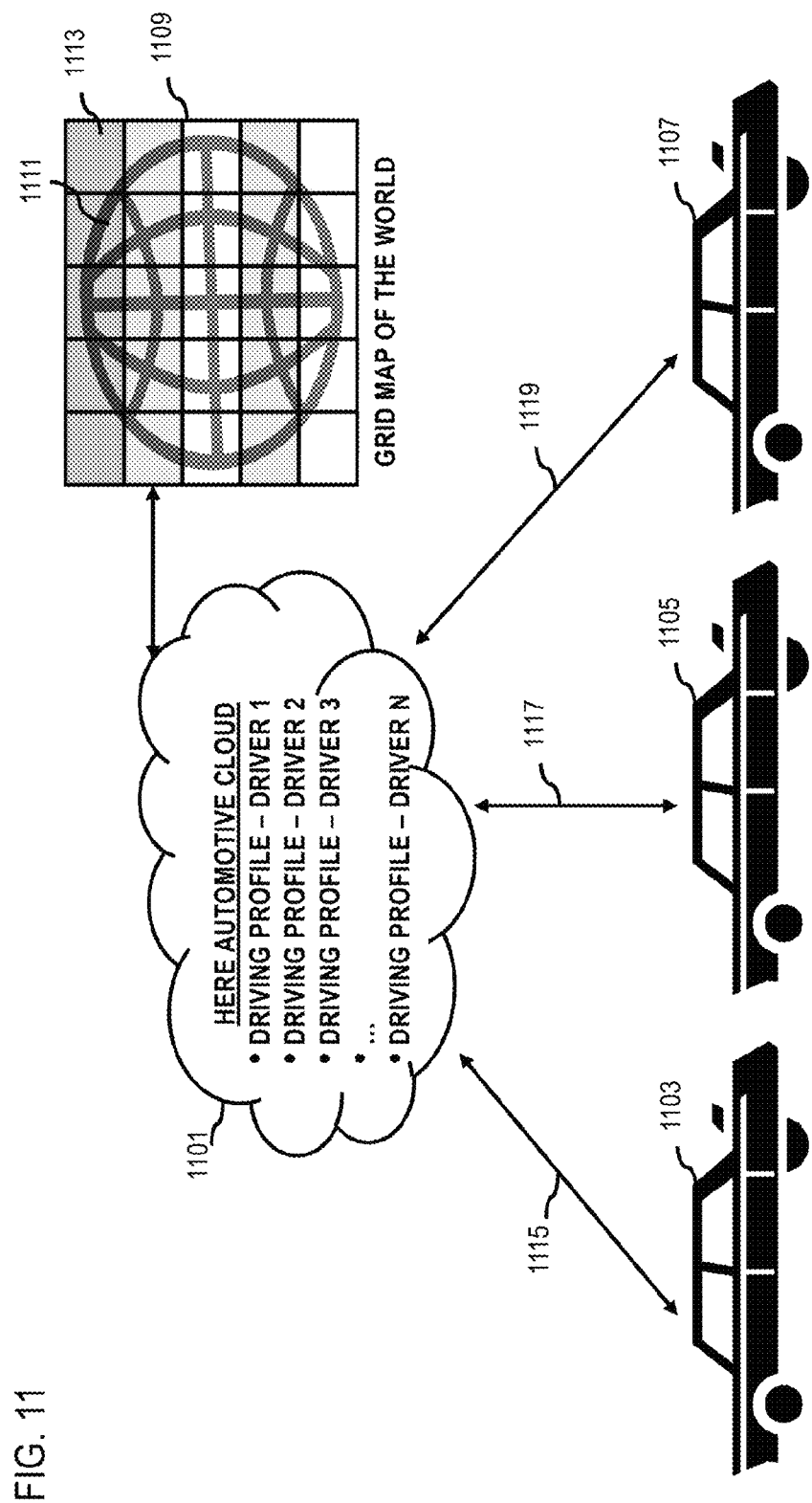
FIG. 11 is a user interface diagram that represents a scenario wherein the receiving entities maintains a gridded map of the earth, according to one example embodiment.

FIG. 11 is a user interface diagram that represents a scenario wherein the receiving entities maintains a gridded map of the earth, according to one example embodiment. In one embodiment, the one or more receiving entities [1101, 1103, 1105, 1107] maintain a gridded map of the world [1109]. The cells [1111] in the gridded map may be of equal or unequal sizes and may vary at the implementation level. Each cell [1111] maintains several pieces of information including cell identification, bounding box representing the location coordinates, amount and time of sensor data it received, timestamp of when other vehicles may visit the candidate's cell (e.g. based on current vehicle locations, location prediction, and historic trips), etc. In another embodiment, only location information (i.e. D-GPS) is submitted by the one or more vehicles [1103, 1105, 1007] to the receiving entity [1101] at all times, wherein the resolution of the sensor data is determined based, at least in part, on the location of the at least one vehicle. For example, sensor data in some regions such as blind spots may have higher resolution, whereas sensor data at lesser important regions are collected at lower resolutions. The importance of different regions is determined based, at least in part, on the amount of available sensor data, the current and future path of other vehicles, or a combination thereof. In a further embodiment, the sensor data is submitted to the receiving entity [1101] on a request basis, for example, when a receiving entity [1101] request data from one or more vehicle [1103, 1105, 1107], the one or more vehicle [1103, 1105, 1107] may submit the sensor data. Then, the receiving entity [1101] checks in which cell [1111] within the grid [1113] is the vehicle currently located. After the cell [1111] is identified, if there is not enough data about the cell [1111], then a request is sent to the one or more vehicles [1103, 1105, 1107] to submit telematics sensor in real time or from the cache at some resolution based, at least in part, on the amount of information, the timestamp of the sensor data that that was submitted by other vehicles who were in the same cell previously, or a combination thereof. In one example embodiment, if the grid cell where the at least one vehicle [1103] is located has just received telematics sensor data from other vehicles [1105, 1107] in the last millisecond or so, then there is no need to request new sensor information. In one scenario, if the cloud [1101] receives sensor information from several vehicles [1103, 1105, 1107] in a cell that have their windshield wipers on, there is no need to request additional information over the channels [1115, 1117, 1119] from the other vehicles that crosses the cell. In another scenario, if a cell is to be visited by other vehicles [1105, 1107] in the near future, then a fraction of the current cell's candidate vehicle's [1103] data can be taken into consideration, and when the other vehicles [1105, 1107] arrive in the current cell, additional sensor data can be requested. In this manner, the vehicles [1103, 1105, 1107] need not utilize all of its available bandwidth. In a further scenario, if the at least one vehicle [1103] submits its location information to a receiving entity [1101] and the receiving entity [1101] identifies the at least one vehicle's cell [1111] and decides that there is adequate sensor data, then the receiving entity [1101] may notify the at least one vehicle [1103] that no sensor data needs to be submitted, and/or the bounding box of its current cell [1111]. Pursuant to this, the at least one vehicle may not submit location data to the receiving entity unless it goes outside the bounding box. In this manner, the amount of location information that is sent over the channel [1115, 1117, 1119] is minimized.

Figure 12:
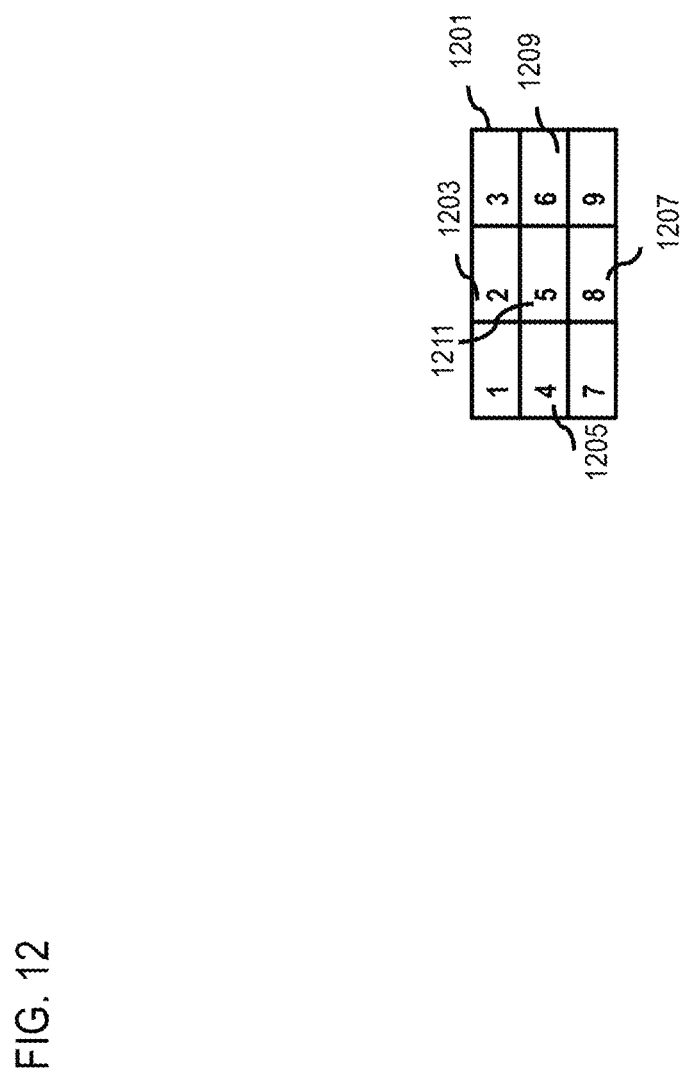
FIG. 12 is a grid diagram that represents a bottom-up extrapolation of sensor information from other vehicles, according to one example embodiment.

FIG. 12 is a grid diagram that represents a bottom-up extrapolation of sensor information from other vehicles, according to one example embodiment. In one scenario, the at least one cell does not have any telematics sensor data, however the one or more neighboring cells have telematics sensor data from other vehicles. Then, the cloud may extrapolate telematics sensor data and may reduce telematics sensor data collection from one or more vehicles. However, there is a need to extrapolate sensor data for cells which have stale or limited sensor data from cells that have current and stable sensor data. In one embodiment, a way to extrapolate initial data for an empty candidate cell is to consider a function on data within the other neighboring cells. For example, as reflected in the grid in the grid [1201], cells 2 [1203], 4 [1205], 8 [1207], and 6 [1209] have adequate sensor data, whereas cell 5 [1211] is empty, then the cloud could extrapolate from the other cells using some function, for example, an average of the neighboring cells 2 [1203], 4 [1205], 8 [1207], and 6 [1209]. In such manner, several levels of functions may be implemented to consider more distant neighbors. The confidence on the usage of data with levels in the bottom-up expansion is inversely proportion.

The processes described herein for processing and transmitting sensor data in a bandwidth efficient manner may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
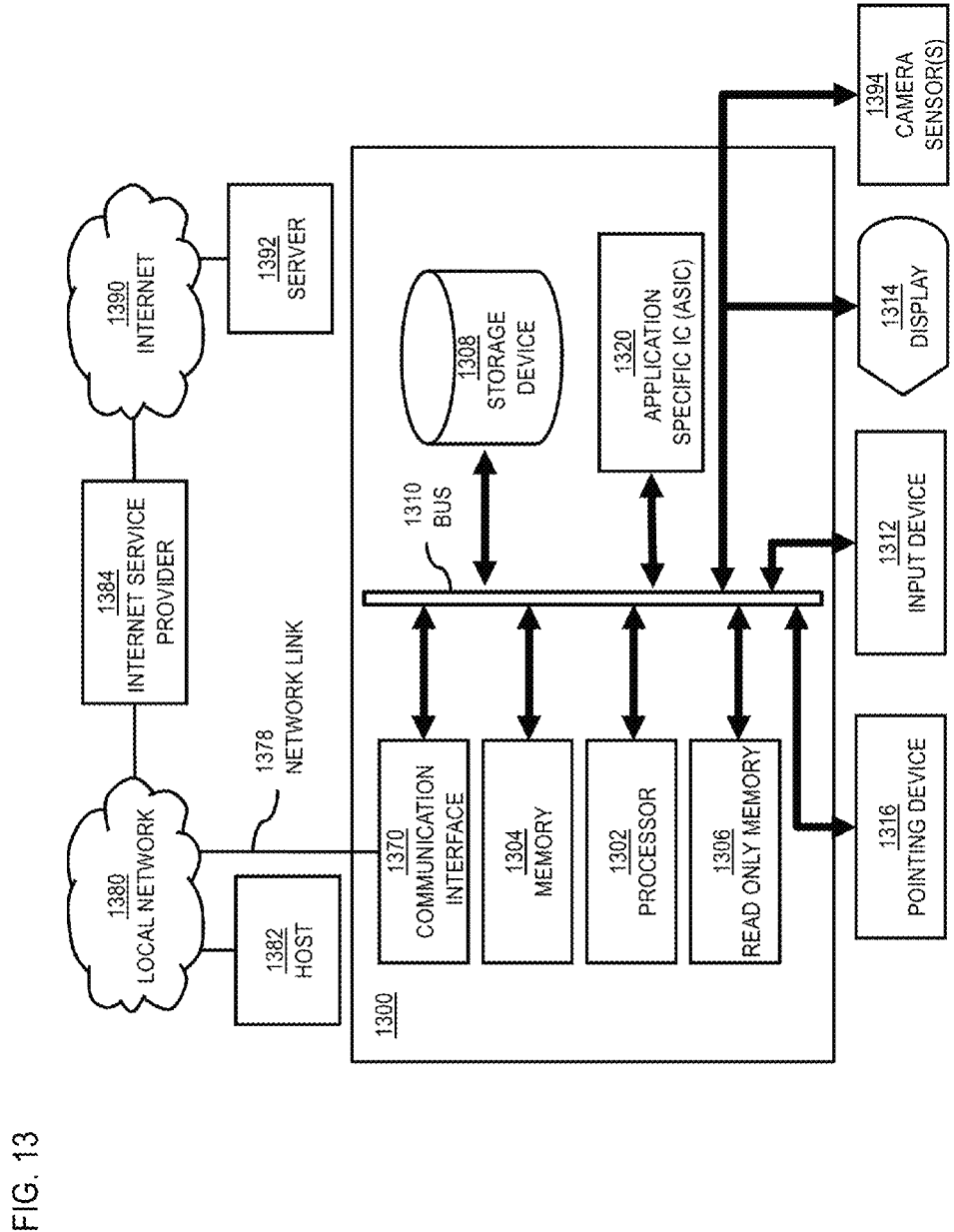
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system 1300. Computer system 1300 is programmed (e.g., via computer program code or instructions) to process and transmit sensor data in a bandwidth efficient manner as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of processing and transmitting sensor data in a bandwidth efficient manner.

A bus 1310 includes one or more parallel conductors of information so that information is transferred quickly among devices coupled to the bus 1310. One or more processors 1302 for processing information are coupled with the bus 1310.

A processor (or multiple processors) 1302 performs a set of operations on information as specified by computer program code related to process and transmit sensor data in a bandwidth efficient manner. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1300 also includes a memory 1304 coupled to bus 1310. The memory 1304, such as a random access memory (RAM) or any other dynamic storage device, stores information including processor instructions for processing and transmitting sensor data in a bandwidth efficient manner. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or any other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for processing and transmitting sensor data in a bandwidth efficient manner, is provided to the bus 1310 for use by the processor from an external input device 1312, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT), a liquid crystal display (LCD), a light emitting diode (LED) display, an organic LED (OLED) display, a plasma screen, or a printer for presenting text or images, and a pointing device 1316, such as a mouse, a trackball, cursor direction keys, or a motion sensor, for controlling a position of a small cursor image presented on the display 1314 and issuing commands associated with graphical elements presented on the display 1314, and one or more camera sensors 1394 for capturing, recording and causing to store one or more still and/or moving images (e.g., videos, movies, etc.) which also may comprise audio recordings. In some embodiments, for example, in embodiments in which the computer system 1300 performs all functions automatically without human input, one or more of external input device 1312, display device 1314 and pointing device 1316 may be omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of ASICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 107 for processing and transmitting sensor data in a bandwidth efficient manner to the UE 101.

The term "computer-readable medium" as used herein refers to any medium that participates in providing information to processor 1302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1308. Volatile media include, for example, dynamic memory 1304. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1320.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system 1300 can be deployed in various configurations within other computer systems, e.g., host 1382 and server 1392.

At least some embodiments of the invention are related to the use of computer system 1300 for implementing some or all of the techniques described herein. According to one embodiment of the invention, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein. In alternative embodiments, hardware, such as ASIC 1320, may be used in place of or in combination with software to implement the invention. Thus, embodiments of the invention are not limited to any specific combination of hardware and software, unless otherwise explicitly stated herein.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server host 1392 transmits program code for a particular application, requested by a message sent from computer 1300, through Internet 1390, ISP equipment 1384, local network 1380 and communications interface 1370. The received code may be executed by processor 1302 as it is received, or may be stored in memory 1304 or in storage device 1308 or any other non-volatile storage for later execution, or both. In this manner, computer system 1300 may obtain application program code in the form of signals on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

FIG. 14 illustrates a chip set or chip 1400 upon which an embodiment of the invention may be implemented. Chip set 1400 is programmed to process and transmit sensor data in a bandwidth efficient manner as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. Chip set or chip 1400, or a portion thereof, constitutes a means for performing one or more steps of providing user interface navigation information associated with the availability of functions. Chip set or chip 1400, or a portion thereof, constitutes a means for performing one or more steps of processing and transmitting sensor data in a bandwidth efficient manner.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to process and transmit sensor data in a bandwidth efficient manner. The memory 1405 also stores the data associated with or generated by the execution of the inventive steps.

Figure 15:
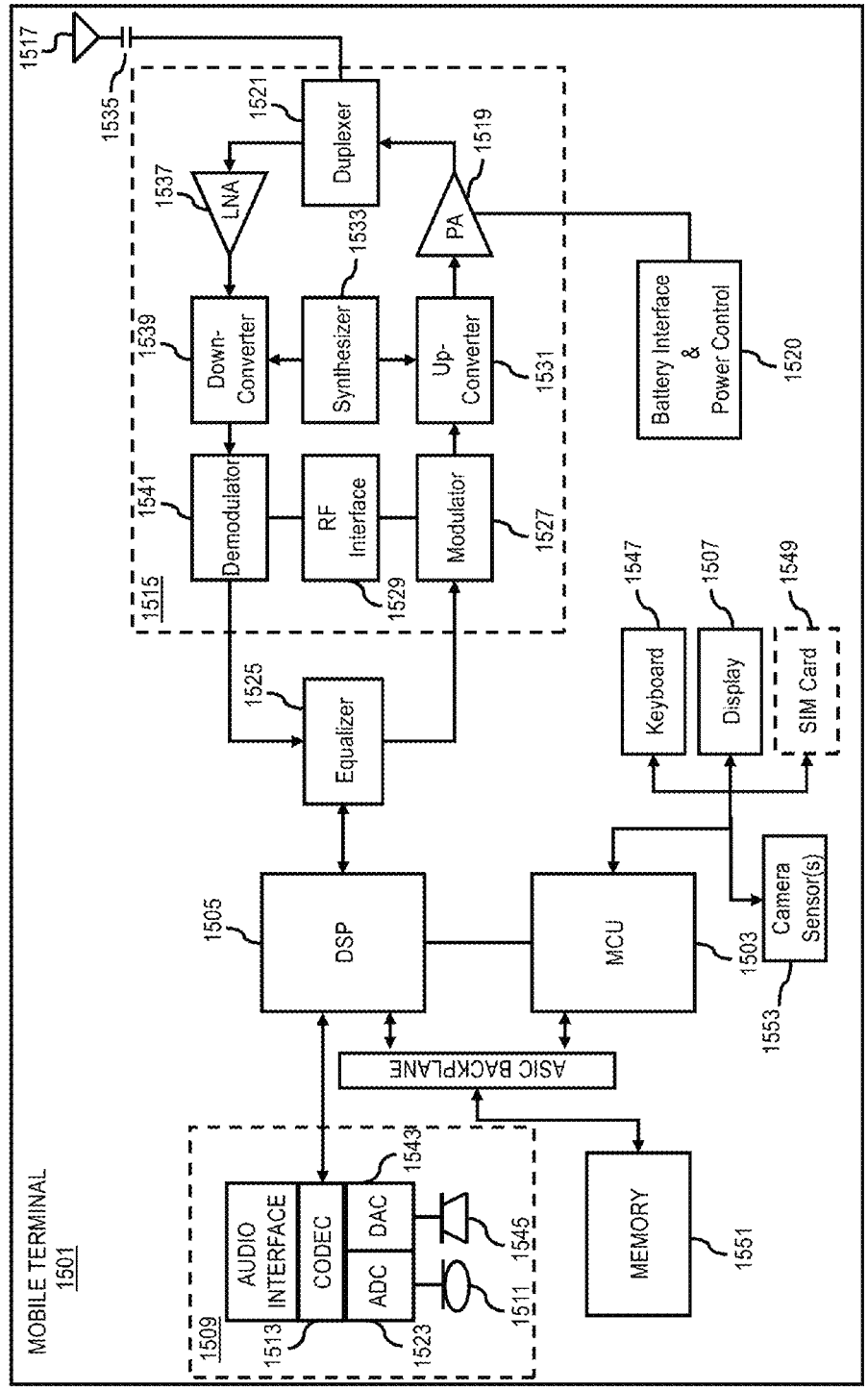
FIG. 15 is a diagram of a mobile terminal (e.g., handset) that can be used to implement an embodiment of the invention.

FIG. 15 is a diagram of exemplary components of a mobile terminal (e.g., handset) for communications, which is capable of operating in the system of FIG. 1, according to one embodiment. In some embodiments, mobile terminal 1501, or a portion thereof, constitutes a means for performing one or more steps of processing and transmitting sensor data in a bandwidth efficient manner. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps of processing and transmitting sensor data in a bandwidth efficient manner. The display 1507 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503 which can be implemented as a Central Processing Unit (CPU).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile terminal 1501 to process and transmit sensor data in a bandwidth efficient manner. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network. The card 1549 also contains a memory for storing a personal telephone number registry, text messages, and user specific mobile terminal settings.

Further, one or more camera sensors 1553 may be incorporated onto the mobile station 1501 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving, by an apparatus associated with a receiving entity via a network, telematics sensor data from telematics sensors of a plurality of autonomous vehicles;
    determining, by the apparatus, current locations and future locations of the autonomous vehicles in a grip map based on the telematics sensor data;
    determining, by the apparatus, one or more data requests specifying different data cacheability indicators per sensor for one or more of the telematics sensors of the autonomous vehicles located within one or more bounded geographic areas in the grip map based, at least in part, on whether currently available telematics sensor data meet one or more data requirements associated with the current locations and the future locations;
    transmitting, by the apparatus, the one or more data requests to the one or more of the autonomous vehicles; and
    in response to the one or more data requests, receiving, by the apparatus, additional telematics sensor data for assisted driving of one or more of the autonomous vehicles in the one or more bounded geographic areas.

2. The method of claim 1, wherein the data cacheability indicators are determined based on respective telematics sensor data relevancy to driving safety of one or more of the autonomous vehicles in the one or more bounded geographic areas.

3. The method of claim 2, wherein the telematics sensor data are non-cacheable in the autonomous vehicles and received in real time by the apparatus, and the method further comprising:
    receiving cacheable telematics sensor data from the telematics sensors of the autonomous vehicles in batch at a predetermined frequency.

4. The method of claim 3, further comprising:
    determining that there is sufficient telematics sensor data available for one of the bounded geographic areas; and
    informing the vehicles not to transmit the non-cacheable telematics sensor data, the cacheable telematics sensor data, or a combination thereof.

5. The method of claim 3, wherein the predetermined frequency is determined based, at least in part, on a polling frequency, a maximum cache duration, an acceptable deviation criterion, or a combination thereof, per sensor stored in a table for the telematics sensors.

6. The method of claim 1, wherein the apparatus is embedded one of the vehicles on in one mobile device located in the one vehicle, and the vehicles operate in a non-cloud peer-based architecture.

7. The method of claim 1, wherein the apparatus is embedded in a cloud node, and the vehicles operate in a cloud-based architecture.

8. The method of claim 1, further comprising:
    determining that there is no or not sufficient telematics sensor data available for one of the bounded geographic areas; and
    extrapolating telematics sensor data from one or more neighboring bounded geographic areas by averaging the extrapolated telematics sensor data to meet the one or more data requirements.

9. The method of claim 8, wherein the one bounded geographic area is a street intersection region.

10. The method of claim 8, further comprising:
    processing contextual data to select the one or more neighboring bounded geographic areas for performing the extrapolation.

11. An apparatus comprising:
    at least one processor; and
    at least one memory including computer program code for one or more programs,
    the at least one memory and the computer program code configured to, with the at least one processor, cause the apparatus associated with a receiving entity to perform at least the following,
        receive, via a network, telematics sensor data from telematics sensors of a plurality of autonomous vehicles;
        determine current locations and future locations of the autonomous vehicles in a grip map based on the telematics sensor data;
        determine one or more data requests specifying different data cacheability indicators per sensor for one or more of the telematics sensors of the autonomous vehicles located within one or more bounded geographic areas in the grip map based, at least in part, on whether currently available telematics sensor data meet one or more data requirements associated with the current locations and the future locations;
        transmit the one or more data requests to the one or more of the autonomous vehicles; and
        in response to the one or more data requests, receive additional telematics sensor data for assisted driving of one or more of the autonomous vehicles in the one or more bounded geographic areas.

12. The apparatus of claim 11, wherein the data cacheability indicators are determined based on respective telematics sensor data relevancy to driving safety of one or more of the autonomous vehicles in the one or more bounded geographic areas.

13. The apparatus of claim 12, wherein the telematics sensor data are non-cacheable in the autonomous vehicles and received in real time by the apparatus, and the apparatus is further caused to:
    receive cacheable telematics sensor data from the telematics sensors of the autonomous vehicles in batch at a predetermined frequency.

14. The apparatus of claim 13, wherein the apparatus is further caused to:
    determine that there is sufficient telematics sensor data available for one of the bounded geographic areas; and
    inform the vehicles not to transmit the non-cacheable telematics sensor data, the cacheable telematics sensor data, or a combination thereof.

15. The apparatus of claim 13, wherein the predetermined frequency is determined based, at least in part, on a polling frequency, a maximum cache duration, an acceptable deviation criterion, or a combination thereof, per sensor stored in a table for the telematics sensors.

16. The apparatus of claim 11, wherein the apparatus is embedded one of the vehicles on in one mobile device located in the one vehicle, and the vehicles operate in a non-cloud peer-based architecture.

17. The apparatus of claim 11, wherein the apparatus is embedded in a cloud node, and the vehicles operate in a cloud-based architecture.

18. The apparatus of claim 11, wherein the apparatus is further caused to:
 determine that there is no or not sufficient telematics sensor data available for one of the bounded geographic areas; and
 extrapolate telematics sensor data from one or more neighboring bounded geographic areas by averaging the extrapolated telematics sensor data to meet the one or more data requirements.

19. The apparatus of claim 18, wherein the one bounded geographic area is a street intersection region.

20. The apparatus of claim 18, wherein the apparatus is further caused to:
 process contextual data to select the one or more neighboring bounded geographic areas for performing the extrapolation.

* * * * *